United States Patent [19]

Greeson et al.

[11] Patent Number: 4,672,548

[45] Date of Patent: Jun. 9, 1987

[54] SPEED CAPTURE IN CLIMB FOR AIRCRAFT

[75] Inventors: Jeffrey A. Greeson; Terry L. Zweifel, both of Phoenix, Ariz.

[73] Assignee: Sperry Corporation, New York, N.Y.

[21] Appl. No.: 650,742

[22] Filed: Sep. 17, 1984

[51] Int. Cl.⁴ .................... G06F 15/50; G05D 1/08
[52] U.S. Cl. ................................ 364/433; 244/182
[58] Field of Search .............. 364/433, 434, 427; 244/180, 181, 182

[56] References Cited

U.S. PATENT DOCUMENTS 3,691,356  9/1972  Miller ................................ 244/182

| | | | |
|---|---|---|---|
| 4,114,842 | 9/1978 | Hofferber et al. | 364/433 |
| 4,277,041 | 7/1981 | Marrs et al. | 244/182 |
| 4,377,848 | 3/1983 | Flannigan et al. | 244/180 |
| 4,488,235 | 12/1984 | Miller | 364/433 |
| 4,490,793 | 12/1984 | Miller | 364/433 |

Primary Examiner—Gary Chin
Attorney, Agent, or Firm—Howard P. Terry; Arnold L. Albin

[57] ABSTRACT

An improved method for the automatic acceleration of an aircraft to a preselected speed is described. At any point in the climb portion of flight, a capture of a computed altitude that is increased at a specified rate is performed to provide optimal acceleration.

6 Claims, 4 Drawing Figures

SPEED CAPTURE IN CLIMB FOR AIRCRAFT

BACKGROUND OF THE INVENTION

1. Field of the Invention

The present invention relates generally to aircraft automatic flight control systems and more specifically to speed control and acceleration to a higher speed during the climb portion of flight.

2. Description of the Prior Art

Most commercial transport aircraft, general aviation aircraft and military aircraft are equipped with an automatic flight control system. Automatic flight control systems generally provide the pilot with the capability of altering the flight path of the aircraft to achieve and maintain a desired speed, measured either in knots or Mach number.

During a climb portion of flight, the pilot may elect to increase the speed of the aircraft through a manually-entered speed command or may be mandated by Air Traffic Control (ATC) to accelerate to a specified speed. Soon after liftoff, the pilot will generally increase the speed of the airplane in order to retract the flaps. In addition, in the United States, the Federal Aviation Administration (FAA) requires that aircraft speed be no greater than 250 knots indicated airspeed at altitudes less than 10,000 feet. Thus the pilot is generally required to accelerate the aircraft in successive steps as the aircraft configuration changes and minimum altitudes are reached. Further, it is desirable to accelerate to the optimum climb speed as quickly as possible in order to maximize fuel savings. In addition, a positive rate of climb should be maintained at all times while accelerating and it is generally an ATC requirements that a minimum climb rate of 500 fpm will be maintained, particularly at low altitudes.

In the prior art, these accelarations were generally accomplished by the well known method of decreasing the pitch attitude of the aircraft in a manner proportional to the difference between the new speed command and the actual speed of the aircraft, or speed error. While this scheme will accelerate the aircraft to the desired Mach or airspeed, there is no assurance this will be done in a timely or optimal manner or that any minimum altitude rate restrictions will be met.

The present invention overcomes the shortcomings of the prior art by computing an altitude based upon the present climb rate, or altitude rate of the aircraft, and then increasing the altitude at a rate that will assure a 500 fpm rate of climb or less if the plane is not capable of accelerating at a climb rate of 500 fpm. This altitude is then used to tend to pitch the aircraft down to achieve the specified rate with the engine(s) at climb thrust until the difference between the desired speed and the actual speed of the aircraft is within a predetermined amount, at which time conventional speed control proportional to speed error is resumed.

SUMMARY OF THE INVENTION

The present invention provides means for automatic, optimal acceleration of an aircraft to a higher selected or commanded speed during the climb portion of flight by the capture of a computed altitude, based on the actual climb altitude rate of the aircraft, that is increased at a specified rate. The rate of increase is generally 500 fpm to provide optimal acceleration and still meet minimum altitude rate restrictions but may be less if the plane is not capable of accelerating at a climb rate of 500 fpm. Means are further provided to automatically command a higher speed, based on pilot-entered or stored data, such that the commanded speed will be achieved when above specified altitudes. Optimal accelerations may thus be achieved either with specified altitude requirements or in the absence of such requirements.

DESCRIPTION OF THE PREFERRED EMBODIMENTS

The present invention is useful in any automatic flight control system or in any performance management system (PMS) that is fully coupled to an automatic flight control system, and provides apparatus for automatically transitioning the aircraft to a higher commanded speed in the climb portion of the flight. In either system, it is often desirable for the pilot to increase the speed of the aircraft to achieve a particular speed in order to retract flaps or to accelerate to 250 knots or the desired climb speed when specified minimum altitudes are reached.

Figure 1:
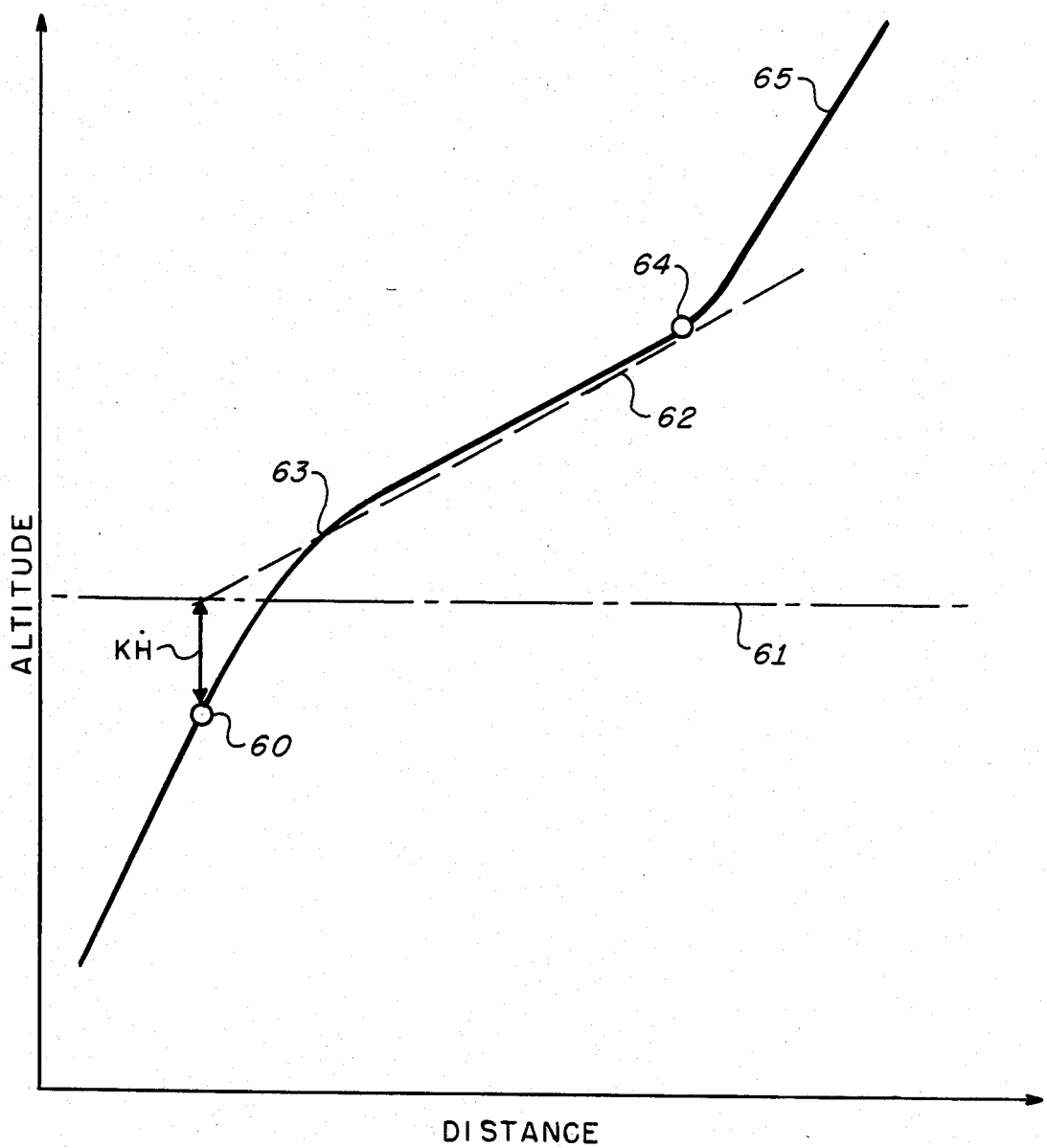
FIG. 1 is a graph of altitude versus distance illustrating the climb flight path generated by the present invention to accelerate to a commanded speed which is significantly higher than the actual speed of the aircraft.

To illustrate the invention, refer to FIG. 1. Assume the aircraft is climbing at an altitude above 10,000 feet and that no acceleration of the aircraft has been commanded. Hence, the aircraft will be climbing at some altitude rate $\dot{H}$. Now assume that the aircraft is to be accelerated by either a pilot-entered or an automatic speed command which is significantly higher than the present speed of the aircraft and that the speed command occurs at 60. A computed altitude 61 is determined by the relationship $$H_S = H + K\dot{H} \tag{1}$$

Where $H_S$ = the computed altitude in feet.

$H$ = the actual altitude of the aircraft in feet.

$K$ = a characterizing parameter that determines the shape of the capture flight path and may be of the form $K = he/ha$ where $he$ = altitude error in feet between the selected altitude and the present altitude and $ha$ = rate of climb.

$\dot{H}$ = the present altitude rate of the aircraft in feet per minute.

It will be noted that the computed altitude will always be $K\dot{H}$ feet above the actual altitude of the aircraft according to equation (1) above.

An increasing altitude 62 which will be used by the autopilot or Performance Management System (PMS) is determined by $$H_{RAMP} = H_S + \dot{H}_{RAMP}(t - t_O) \quad (2)$$

where
- $H_{RAMP}$ = the computed ramping altitude in feet.
- $H_S$ = the initial computed altitude in feet.
- $\dot{H}_{RAMP}$ = the predetermined rate of increase in the computed altitude in feet per minute.
- t = time in minutes
- $t_O$ = time at 60 in minutes It will be noted that when $t = t_O$, or at 60, the ramping computed altitude will equal the initial computed altitude according to equation (2) above.

The automatic flight control system or PMS will then command the elevator or horizontal stabilizer in such a fashion as to alter the flight path of the aircraft along line segment 63 according to the control law:

$$H_E - K\dot{H} = 0 \quad (3)$$

Where
- $H_E$ = altitude error in feet between the computed ramping altitude and the actual altitude.
- K = a characterizing parameter as defined above.
- $\dot{H}$ = the actual altitude rate in feet per minute.

The aircraft will thus accelerate to the new speed command while maintaining the computed ramping altitude until the actual aircraft speed is within some predetermined amount of the commanded speed, for example 0.01 Mach. This event is shown as 64. At 64, the altitude capture control law, equation (3) above, is no longer used and the new speed is maintained using conventional proportional control speed along the line segment 65.

Figure 2:
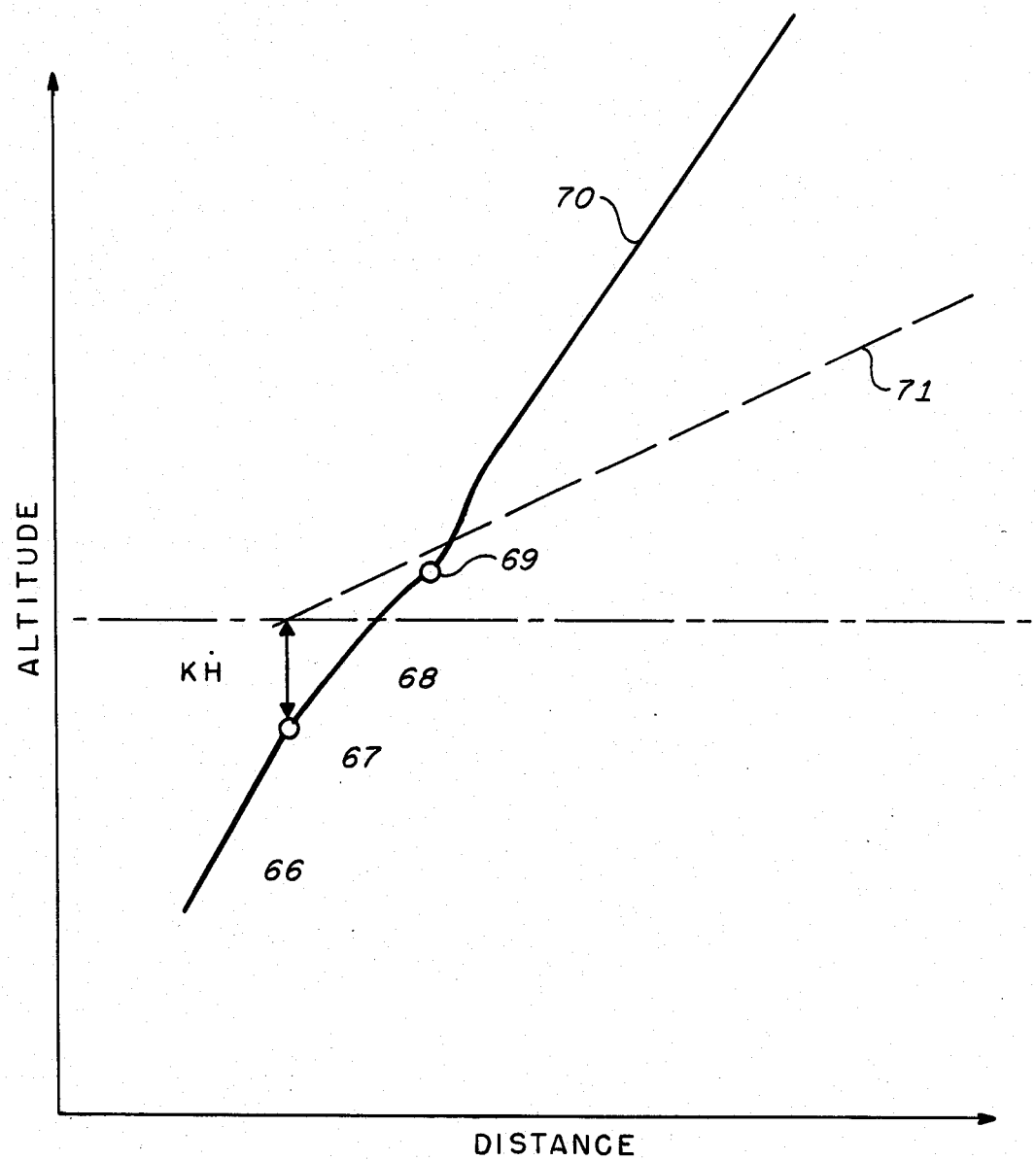
FIG. 2 is a graph of altitude versus distance illustrating the climb flight path generated by the present invention when the commanded speed is only slightly higher than the actual speed of the aircraft.

Referring now to FIG. 2, assume that the newly commanded speed is only slightly more than the present speed of the aircraft, but the difference is greater than some predetermined amount, for example 0.005 Mach. Further assume that the new speed command occurs at 67. As in the above example, the present inventin will compute a ramping altitude 71 and the control law expressed by equation (3) will be invoked. As the aircraft begins the capture of the computed ramping altitude along line segment 68, it will also begin to accelerate toward the new commanded speed. When the actual speed is within some predetermined amount of the commanded speed, represented by 69, the capture of the computed ramping altitude is abandoned and conventional speed control is resumed along line segment 70.

By way of example, assume the aircraft is being flown at 250 knots with a climb rate of 3000 feet per minute and has just climbed through 10,000 feet. Assume that a speed command of 300 knots is entered automatically or is entered manually by the pilot. Assume for simplicity that the value of K is held constant at 0.25. The automatic command of the higher speed would result in the computation of an initial capture altitude by equation (1) above and the result would be (10,000+750) or 10,750 feet. Assume that the predetermined rate of change of this altitude is to be 500 feet per minute. According to equation (2), the capture altitude would equal 10,750 feet at the point where the new speed is commanded, would equal 11,250 feet one minute later, 11,750 feet two minutes later and so forth. The control law equation (3) would thereafter be used to capture the ramping altitude and the aircraft would begin to accelerate toward the commanded 300 knots indicated airspeed. Once having achieved the commanded speed within some predetermined amount, the altitude capture control law described above would no longer be used and speed control would revert to conventional proportional control.

To comply with FAA regulations and approved flying procedures, the speed and altitude requirements could either be entered by the pilot or stored within the automatic pilot or PMS. As the aircraft climbs from takeoff to cruising altitude, the climb speeds would automatically be commanded at predetermined altitudes and changes in airplane configuration (i.e., retraction of flaps and landing gear) and the new speed command would be captured in the same fashion illustrated by the above example.

The present invention may be implemented by using conventional analog circuitry and computational techniques or by using conventional wholly digital techniques or by using conventional hybrid digital/analog techniques. To simplify the understanding of the invention, it will be explained by using a generally analog format as shown in FIG. 3, it being understood that the same analog format may also represent, in block diagram form, the program of a programmable digital computer wherein the various analog inputs are converted to digital signals for digital processing and the various digital outputs are converted to analog signals for driving the control surface servomotors and the like.

Figure 3:
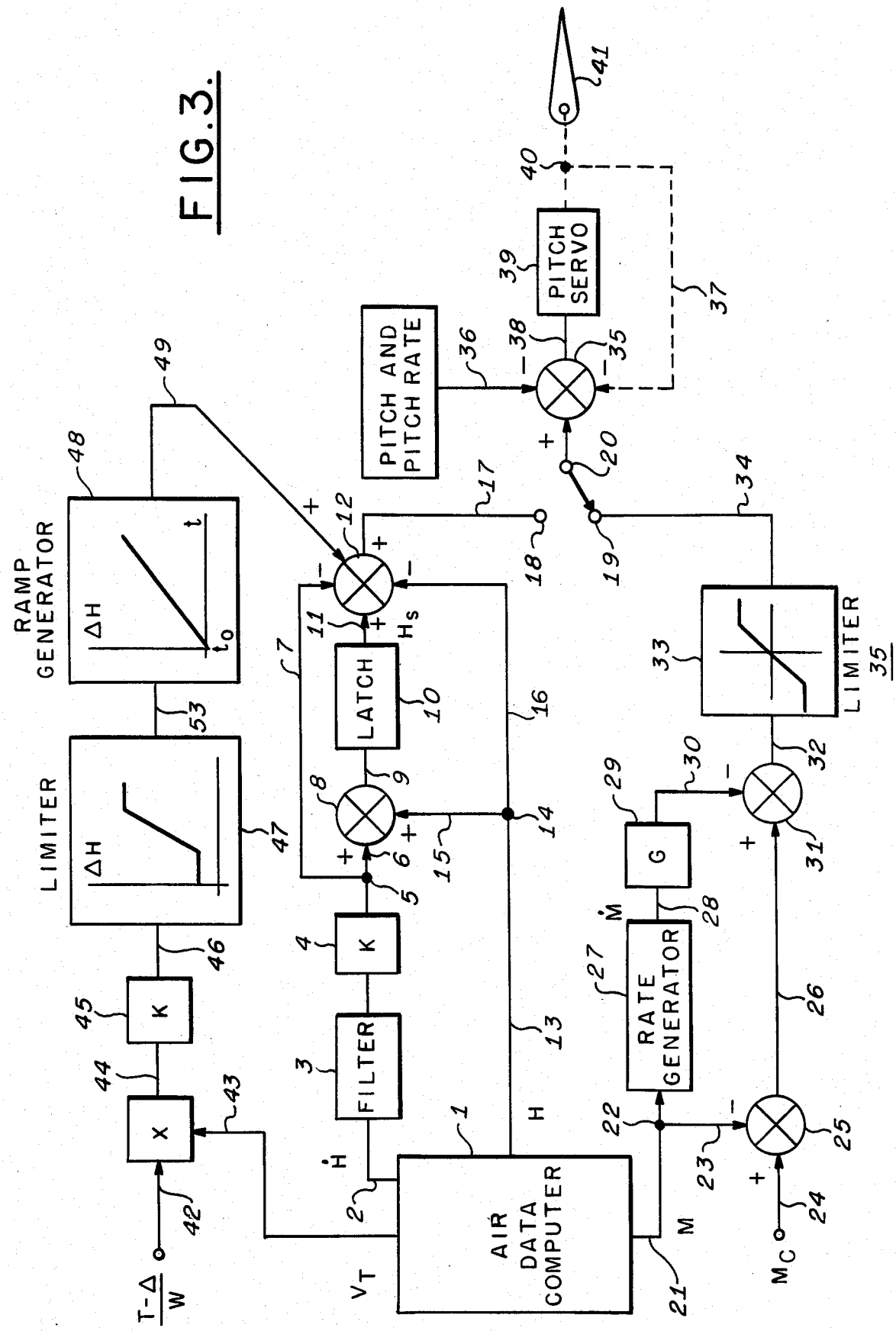
FIG. 3 is a block diagram of the present invention showing the calculation of a computed altitude, the increase of the computed altitude at a selected rate and the switching of pitch control between conventional proportional speed error and automatic capture of the computed altitude.

Referring to FIG. 3, assume the aircraft is climbing at an altitude higher than 10,000 feet and that no acceleration of the aircraft has been commanded. Switch blade 20 will be in the position shown, making contact with contact 19. A signal proportional to the actual Mach number of the aircraft is supplied by conventional air data computer 1 and appears on lead 21 and junction 22. It is compared with a signal proportional to the commanded Mach number, Mc, which appears on lead 24 and is applied to conventional summation device 25. The actual Mach number from junction 22 appears on lead 23 where it is also applied to summation device 25. The output, which represents the difference between the commanded and actual Mach numbers, Mach error, appears on lead 26 and is applied to summation device 31. Simultaneously, the actual Mach number from junction 22 is applied to conventional rate generator 27 whose output appears on lead 28 and is a signal proportional to the time rate of change of actual Mach number or Mach rate. Mach rate is multiplied by an appropriate gain G 29 and the result appears on lead 30 which is supplied to conventional summation device 31. The output of summation device 31, appearing on lead 32, will be the well-known proportional plus rate control of Mach number. Lead 32 supplies limiter 33, whose characteristics appear on the face, with the proportional plus rate signal. Limiter 33 is a conventional limiter whose function is to assure the resultant pitch and pitch rate of the aircraft will be maintained within specified limits. The output of limiter 33 appears on lead 34 and at switch contact 19. This signal is applied to conventional summation device 35 via switch blade 20. Signals proportional to the pitch angle and pitch rate of the aircraft are supplied to summation device 35 via lead 36 in the conventional manner. The output signal of summation device 35 is applied to servomotor 39 which, through the mechanical linkage 40, moves the aircraft's elevator or horizontal stabilizer, 41. Mechanical linkage 37 supplies summation device 35 with a signal proportional to elevator or horizontal stabilizer position so that the signal on lead 38 is reduced to null in the steady state condition.

Simultaneous with the action described above, air data computer 1 supplies a signal proportional to the altitude rate of the aircraft, $\dot{H}$, on lead 2 to filter 3. Filter 3 is a conventional filter whose purpose is to eliminate or minimize atmospheric or electronic noise that may be present on the altitude rate signal. The output signal of filter 3 is supplied to gain block 4 where it is multiplied by a value K which may either be a constant or a variable number. The output signal of gain block 4 appears at junction 5 and represents the term $K\dot{H}$. One lead from junction 5 appears on lead 6 and thence to conventional summation device 8.

Air data computer 1 also supplies a signal proportional to the actual altitude of the aircraft H on lead 13 and at junction 14. One lead from junction 14, lead 15, supplies the altitude signal to summation device 8 where it is algebraically added to the $K\dot{H}$ term explained above. The output of the summation appears on lead 9 and represents the term $H+K\dot{H}$. Lead 9 is supplied to Latch 10 which in the present case is synchronized such that its output on lead 11 is identical with the signal on lead 9.

A signal propotional to the well known relationship (Thrust-Drag)/Weight is applied to lead 42. The term on lead 42 is multiplied by a signal proportional to true airspeed provided on lead 43 by air data computer 1. The resulting term appears on lead 44 and is proportional to the maximum altitude rate that can be achieved by the aircraft. The term on lead 44 is multiplied by gain 45 which is chosen so as to produce a percentage of the maximum altitude rate on lead 46, such as 25%. The term on lead 46 is then limited to be within certain values, such as between 100 fpm and 500 fpm by limiter 47. The resulting limited term on lead 53 represents the rate of increase in the computed capture altitude, $\dot{H}_{RAMP}$. Ramp generator 48 normally produces a delta H value on lead 54 computed as:

$$\text{Delta } H_{RAMP} = \dot{H}_{RAMP} \text{ at } (t-t_0) \qquad (4)$$

Wherer
  Delta $H_{RAMP}$ = the delta H produced by the ramp generator in feet.
  $\dot{H}_{RAMP}$ = rate of increase in the computed altitude in feet per minute.
  t = time in minutes
  $t_0$ = time at start of ramp generation in minutes.
When no acceleration has been commanded, the value of $t_0$ is continuously set equal to t thus providing synchronization and producing a zero term on lead 49.

The $K\dot{H}$ term from junction 5 is supplied to conventional summation device 12 via lead 7. Actual signal from junction 14 is also supplied to summation device 12 via lead 16. The ramping delta H signal is provided to summation device 12 via lead 49. As can be seen, the output of the summation device on lead 17 represents the term $(K\dot{H}+H)-(K\dot{H})-(H)+\dot{H}_{RAMP}$ at $(t-t_0)$ which will be at a null value. The latter term will be at a null value since $t_0$ is continuously set equal to t.

Now assume that the pilot elects to accelerate the aircraft to a new commanded speed by entering the spped through either an analog dial or a computer display panel. If the difference between the newly commanded speed and the old commanded speed exceeds a predetermined value, for example 0.005 Mach, switch blade 20 will be moved to make contact with contact 18 and Latch 10 will be activated. The value appearing on lead 9 which as explained before represents the term $H+K\dot{H}$, at the instant switch blade 20 moves to contact 18 will be stored and maintained on lead 11 regardless of subsequent changes in the value appearing on lead 9. The value of the signal on lead 11 therefore represents a computed altitude $H_S$. The value of $t_0$ at the instant switch blade 20 moves to contact 18 will be stored providing a time reference point for ramp generator 48. Ramp generator 48 will than produce a ramping delta H on lead 49 according to equation (4) above. The values appearing on leads 7 and 16 do vary with time and represent $K\dot{H}$ and H respectively. Thus, the output on lead 17 represents the solution to the expresion:

$$H_S + H_{RAMP}(t-t_0) - H - K\dot{H}$$

This signal is applied to summation device 35 via contact 18 and switch blade 20 and is thence used to manipulate the postion of the aircraft's elevator or horizontal stabilizer in such a fashion as to reduce the value appearing on lead 17 to a null value. This action will cause either an asymptotic or circular flight path towards the computed ramping altitude, $H_{RAMP}$, depending on whether the value of K is a constant or a variable dependent on the actual altitude rate of the aircraft.

As the aircraft pitch angle is decreased during the capture maneuver described above, the aircraft's speed will increase toward the newly selected value. When the difference between the actual speed of the aircraft and the commanded speed is less than some predetermined value, for example 0.01 Mach, switch blade 20 will make contact with contact 19, returning pitch control to the proportional plus rate control of speed described above. In addition, Latch 10 will return to its synchronization mode, ramp generator 48 will return to its synchronization mode and the output on lead 17 will be a null value.

It will be clear that the aircraft may not actually capture the computed altitude if the difference between the newly commanded Mach and the previous Mach command is small. During the decrease in pitch angle of the capture maneuver, the aircraft may acceleate to within the predetermind value before it has captured the ramping altitude. In such cases, a slight decrease in the rate of climb would occur as the aircraft accelerates.

Figure 4:
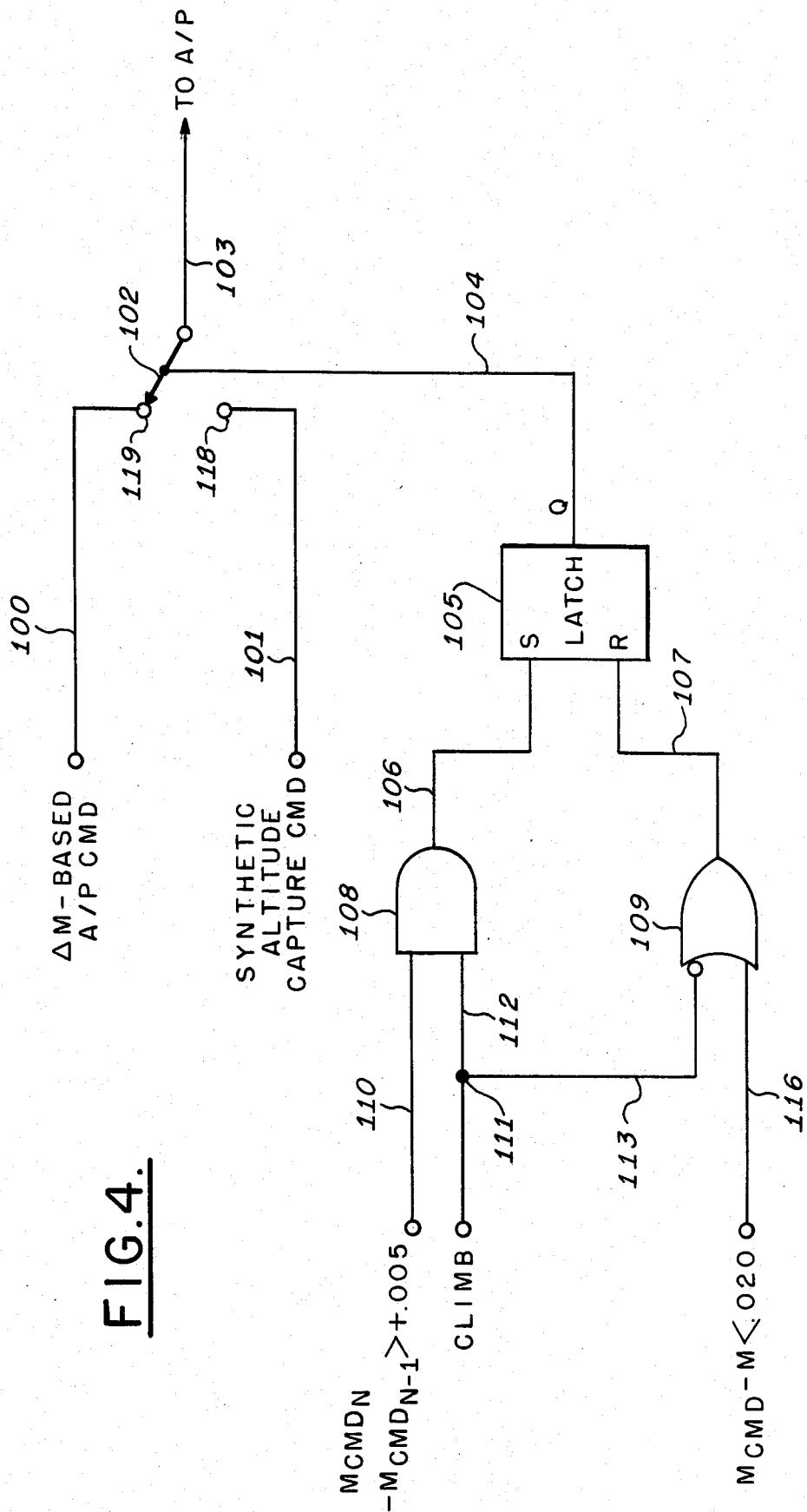
FIG. 4 is a logic diagram illustrating the various parameters used in the controlling of the transfer of speed control from conventional proportional airspeed-on-pitch to the altitude capture acceleration control of the present invention and vice versa.

Referring to FIG. 4, assume the aircraft is climbing at an actual speed M that is within some predetermined amount of the commanded speed McMD such as 0.02 Mach. The condition of being in climb mode will produce a logic 1 at junction 111 and on leads 112 and 113. A logic 1 on lead 113 causes the output on lead 107 of conventional logic OR gate 109 to be the same as that of lead 116. Similarly, a logic 1 on lead 112 will cause the output on lead 106 of conventional logic AND gate 108 to be the same as that of lead 110. In the condition described above, the speed is within the predetermined amount and thus a logic 1 is produced on lead 116. A logic 1 on lead 116 produces a logic 1 as the output on lead 107 from conventional logic OR gate 109. A logic 1 on lead 107 cause conventional latch 105 to be reset producing a logic 0 output on lead 104. A logic 0 on lead 104 will cause switch blade 102 to make contact with 119 and will thus transfer the Mach error or airspeed error based autopilot command to the autopilot via lead 103.

Now assume the commanded speed is increased more than a predetermined amount such as 0.005 Mach, such that a logic 1 is produced on lead 110. A logic 1 on lead 110 will cause a logic 1 to be output on lead 106 from conventional logic AND gate 108. A logic 1 on lead 106 will cause Latch 105 to be set producing a logic 1 as output on lead 104. A logic 1 on lead 104 will cause switch blade 102 to move to make contact with 118. Switch blade 102 will then transfer the synthetic altitude capture autopilot command present on lead 101 to the autopilot via lead 103. When the actual speed is again within the predetermined amount of the commanded speed, a logic 1 will again be produced on lead 116 which, as explained above, will cause switch blade 102 to make contact with 119, returning autopilot control to the speed error based command.

If the mode were not climb, a logic 0 would be produced at junction 111 and on leads 112 and 113. A logic 0 on lead 112 will cause the output on lead 106 of conventional logic AND gate 108 to always be zero regardless of the logic state on lead 110. A zero on lead 106 will cause the conventional Latch 105 to not be set. A logic 0 on lead 113 will cause the output on lead 107 of conventional logic OR gate 109 to always be a logic 1 regardless of the logic state of lead 116. A logic 1 on lead 107 will cause conventional Latch 105 to be reset producing a logic 0 on lead 104 as the output of Latch 105. As explained above, this will cause switch blade 102 to make contact with 119, returning autopilot control to the speed error based command.

From the foregoing, it will be appreciated that the present invention provides improved automatic acceleration of the aircraft in the climb portion of the flight in the following manner;

(1) The aircraft is controlled by the computation and capture of a ramping altitude in such a way as to provide the optimal acceleration to a commanded speed.

(2) The acceleration described above is consistent with altitude rate restrictions imposed on the acceleration.

(3) The aircraft will always maintain a positive rate of climb while accelerating.

While the invention has been described in its preferred embodiment, it is to be understood that the words which have been used are words of description rather than of limitation and that many changes or alterations may be made without departing from the true scope and spirit of the invention in its broader aspects.

What is claimed is:

1. Acceleration control apparatus for a flight control system for automatic transistion of an aircraft from a first speed to a selected higher speed including servo means for controlling aircraft pitch attitude comprising:

first means coupled to receive signals representative of a rate of change of said first aircraft speed and of said selected higher speed and generating a first signal representative of proportional plus rate control of the aircraft speed based on the received signals, second means coupled to receive signals representative of said aircraft's actual altitude, rate of climb, true airspeed and thrust minus drag divided by weight and providing a second signal representative of a computed altitude beginning at a predetermined point above an actual altitude of said aircraft based on the received signals, said computed altitude being increased at a selected rate to maintain said aircraft in a predetermined rate of climb, and means coupled to receive a climb signal, said true airspeed and first and second predetermined speed commands for selecting said first and second signals, based on the received signals, for coupling to said servo means.

2. Acceleration control apparatus according to claim 1 wherein said first means for providing said first signal includes means responsive to signals proportional to said actual aircraft speed and said selected higher speed for providing a first error signal proportional to the difference between said actual aircraft speed and said selected higher speed, means responsive to signals proportional to said actual aircraft speed for providing a time rate of change signal proportional to said actual aircraft speed, means responsive to said time rate of change signal and said first error signal for providing a second error signal proportional to the difference between said first error signal and said time rate of change signal, and means responsive to said second error signal for limiting said second error signal within a predetermined range, wherein said limited second error signal represents said first signal for coupling to said servo means.

3. Acceleration control apparatus according to claim 1 wherein said second means for providing said second signal includes means responsive to a first algebraic sum of signals proportional to actual altitude and rate of climb of said aircraft for providing a latched signal, means for providing a ramp signal proportional to a signal representative a maximum rate of climb achievable for said aircraft wherein said maximum achievable rate of climb signal is limited to a predetermined range, multiplication means responsive to signals proportional to said aircraft's true air speed and thrust minus drag divided by weight for providing said signal representative of maximum achievable rate of climb, and means for providing a second algebraic sum of signals comprising said ramp signal, said latched signal, and said signals proportional to actual altitude and climb rate of said aircraft, said second algebraic sum represents said second signal.

4. Acceleration control apparatus as recited in claim 3 wherin said latched signal is of the form $$H_S = H + K\dot{H}$$

Where
$H_S$ = computed altitude in feet
$H$ = actual altitude of the aircraft in feet
$K$ = a parameter that determines the shape of the flight path of the form $K = he/\dot{h}a$ where $he$ = altitude error in feet between the selected altitude and the present altitude and $\dot{h}a$ = rate of climb
$\dot{H}$ = present rate of climb of the aircraft in feet per minute.

5. Acceleration control apparatus as recited in claim 3 wherein said ramp signal is of the form $$H_{RAMP} = \dot{H}_S + H_{RAMP}(t-t_0)$$

Where
$H_{RAMP}$ = computed ramping altitude in feet
$H_S$ = initial computed altitude in feet $\dot{H}_{RAMP}$ = predetermined rate of increase in the computed altitude in feet per minute
t = time in minutes
$t_0$ = time at initial computed altiude 6. Acceleration control apparatus as recited in claim 3 wherein said second algebraic sum signal is of the form $$H_E - K\dot{H} = 0$$

Where
$H_E$ = altitude error in feet between the computed ramping altitude and the actual altitude
K = a parameter that determines the shape of the flight path of the form K=he/ḣa where he=altitude error in feet between the selected altitude and the present altitude and ḣa=rate of climb
$\dot{H}$ = said actual rate of climb in feet per minute.

* * * * *